Patented Apr. 23, 1935

1,998,896

UNITED STATES PATENT OFFICE 1,998,896

MANUFACTURE OF RUBBER ARTICLES

Walter Kay, Bury, England

No Drawing. Application November 1, 1932,
Serial No. 640,651. In Great Britain November
5, 1931

6 Claims. (Cl. 18—58)

This invention relates to the manufacture of molded or cast rubber articles, such particularly as shoes and like open hollow articles.

The principal object of the invention is to render possible the manufacture of such an article as a shoe in a single piece without any seam by a very simple process. Another object is to manufacture articles of various sizes with a minimum of apparatus.

Processes have been proposed for manufacturing rubber articles by dipping formers, either heated or unheated, into heat sensitive latex mixtures or by extruding such mixtures through heated dies. Such mixtures have the property of being stable at ordinary temperatures, but of setting or gelling when heated. By means of the said processes it is possible to control the thickness of the article formed within certain limits, but it has not, as far as I am aware, hitherto been possible to make in a single piece, articles which have parts differing substantially in thickness, for example, shoes having integral heels.

In proceeding in accordance with the present invention, a rubber article is made by pouring into a mold comprising a shell and a core a sensitive mixture containing a substantial proportion of an aqueous dispersion of natural or synthetic rubber, and causing the mixture to set in the shell around the core. Advantageously heat may be applied to the shell, but the core need not be directly heated at all. The shell of the mold may, of course, be made in two or more parts which can be assembled around the core.

When articles having portions of different thickness are to be made, the mold may be subjected to differential heating, that is to say, at least initially heated to a greater extent at the thicker parts of the article than at the thinner ones. For example, in the manufacture of a shoe, the mold may be placed initially in a shallow layer of hot water so that the heel is immersed and is subjected to direct heating, while the upper is subjected only to heating by the steam rising from the water and by the heat transmitted by convection. If desired, such a mold may subsequently be completely or substantially completely immersed in hot water.

The expression "aqueous dispersion of natural or synthetic rubber" is intended to include rubber latex, whether concentrated or not, either natural or preserved or vulcanized or even pre-agglomerated, or an aqueous dispersion of crude or vulcanized rubber, (either reclaimed or virgin), an aqueous dispersion manufactured by chemical synthesis from such substances as isoprene, butadiene or their homologues, and other like dispersions. Such a dispersion is rendered sensitive by the addition of a substance or mixture of substances capable of furnishing an adequate quantity of positively charged ions to effect a reversal of charge of the negatively charged rubber particles of the latex. This mixture is then sensitive in the sense that on being subjected for a sufficient time to a temperature which depends upon its composition it sets or gels irreversibly with a change of phase of its components, both the rubber and the water being continuous phases and all the water being uniformly dispersed throughout the gel. In the present process no coagulation occurs as that term is commonly understood, i. e. there is no separation of the serum from the rubber.

A further feature of the present invention consists in controlling the degree of shrinking of the formed article by drying it on a last or former of the desired final size. This is of particular advantage in the manufacture of shoes, because a single mold can be used for the manufacture of shoes of, say, three different standard sizes, as it is found that the formed article will shrink down uniformly on a last which is smaller than the core of the mold in which it was formed.

In order to obtain such uniform shrinking, it is necessary to use a mixture which sets or gels irreversibly and completely with uniform distribution of the water contained in it, and for this purpose it is preferred to ensure that the total dry residue contained represents at least 60 per cent of the mixture and to use a dispersion as highly concentrated as possible. Particularly advantageously, the mixture may be made in the manner described in my co-pending application Serial No. 640,650, filed November 1, 1932, that is to say, a stable mixture may first be formed and then rendered unstable by the addition of a setting agent, just before the mixture is poured into molds.

The coherent, but tough, articles which are formed in the molds according to the present invention are initially micro-porous. The drying must therefore take place under such conditions as to permit escape of water contained in the article, before it becomes non-porous through shrinkage. When the articles have been dried they are vulcanized and then may advantageously be subjected to a swelling treatment by being dipped in a rubber enamel or solution or a plain solvent, such as petrol or naphtha, which swells the material and destroys the characteristic of a latex film. Articles thus treated may advantageously be subjected to cold vulcanization of the adherent rubber enamel by, for example, sulphur monochloride which produces a good finish without the disadvantages usual in sulphur chloride vulcanization of latex products.

The molds used do not have to be porous at all and can advantageously, therefore, be made of light metal. It will be appreciated that since the water is uniformly distributed through the set or gelled article the degree of shrinkage is uniform, even with such an article as a rubber shoe with a relatively thick heel.

Of course, any desired vulcanizing agents, accelerators and so forth may be included in the mixture and the dried article can be vulcanized in any desired way.

While differential heating of the kind described is most advantageous in the manufacture of articles having parts of different thickness, heating is not essential in the manufacture of articles according to the invention, and by using suitable mixtures as described in my application recited above, setting may take place in the cold.

A typical mix for use in the present process consists of:

| | | |
|---|---|---|
| The concentrated latex sold under the trade mark "Revertex" | grs. | 1300 |
| Zinc carbonate | grs. | 150 |
| Sulphur | grs. | 30 |
| Zinc diethyl dithiocarbamate | grs. | 10 |
| Water | cc. | 415 |

This mix is rendered unstable by the addition of 230 cc. of a 30% ammonium nitrate solution, and the resultant mixture is poured into a mold. In order to obtain the quick setting which is so desirable, the mold should be heated to, for example, 80 to 90° C. If, however, cold setting is desired, the proportion of the setting agent should be increased, for example by taking 380 cc. of a 71% ammonium nitrate solution.

I claim:

1. In a process for the manufacture of an open hollow rubber article, the steps which comprise preparing a mixture containing an aqueous dispersion of natural or synthetic rubber and sensitive in the sense that after a period depending upon the temperature to which it is subjected it sets or gels irreversibly with a change of phase of its components both the rubber and the water being continuous phases and all the water being uniformly dispersed throughout the gel, pouring such mixture into a mold comprising a shell and a core, maintaining the shell at a temperature dependent upon the composition of the mixture for a sufficient time to cause the mixture to gel or set while leaving the core unheated by any direct heating, removing the article thus formed from the mold, drying the article under such conditions as to permit escape of water dispersed throughout the gel, and subjecting it to vulcanization.

2. In a process for the manufacture of an open hollow rubber article, the steps which comprise preparing a mixture containing an aqueous dispersion of natural or synthetic rubber and sensitive in the sense that after a period depending upon the temperature to which it is subjected it sets or gels irreversibly with a change of phase of its components both the rubber and the water being continuous phases and all the water being uniformly dispersed throughout the gel, pouring such mixture into a multiple part hollow mold comprising a shell and a core, causing the mixture to gel or set in the mold, removing the article thus formed from the mold, placing it on a last or former of the size desired for the final article, allowing it to dry thereon while shrinking if necessary to the desired final size, and maintaining such conditions during drying as will permit escape of water contained in the said article dispersed throughout the gel.

3. In a process for the manufacture of an open hollow rubber article, the combination of the steps claimed in claim 1 and subjecting the dried article to a swelling treatment.

4. In a process for the manufacture of an open hollow rubber article, the combination of the steps claimed in claim 2 and subjecting the dried article to a swelling treatment.

5. In a process for the manufacture of an open hollow rubber article, the steps which comprise preparing a mixture containing an aqueous dispersion of natural or synthetic rubber and sensitive in the sense that after a period depending upon the temperature to which it is subjected it sets or gels irreversibly with a change of phase of its components both the rubber and the water being continuous phases and all the water being uniformly dispersed throughout the gel, pouring such mixture into a mold comprising a shell and a core, maintaining the shell at a temperature dependent upon the composition of the mixture for a sufficient time to cause the mixture to gel or set while leaving the core unheated by any direct heating, removing the article thus formed from the mold, drying the article under such conditions as to permit escape of water contained in it, subjecting the dried article to a swelling treatment, and then subjecting it to cold vulcanization.

6. In a process for the manufacture of an open hollow rubber article, the steps which comprise preparing a mixture containing an aqueous dispersion of natural or synthetic rubber and sensitive in the sense that after a period depending upon the temperature to which it is subjected it sets or gels irreversibly with a change of phase of its components both the rubber and the water being continuous phases and all the water being uniformly dispersed throughout the gel, pouring such mixture into a mold comprising a shell and a core, and subjecting the mold to heating which, at least initially, is greater at the thicker parts of the article than at the thinner ones.

WALTER KAY.